(12) United States Patent
Obara (10) Patent No.: US 6,599,021 B2
(45) Date of Patent: Jul. 29, 2003

(54) COMPOUND BEARING APPARATUS

(75) Inventor: Rikuro Obara, Miyota-machi (JP)

(73) Assignee: Minebea Kabushiki-Kaisha, Nagano-Ken (JP)

( * ) Notice: Subject to any disclaimer, the term of this patent is extended or adjusted under 35 U.S.C. 154(b) by 0 days.

(21) Appl. No.: 09/866,754

(22) Filed: May 30, 2001

(65) Prior Publication Data

US 2001/0055433 A1 Dec. 27, 2001

(30) Foreign Application Priority Data

Jun. 19, 2000 (JP) ........................... 2000-183434

(51) Int. Cl.[7] .............................................. F16C 19/08
(52) U.S. Cl. .................... 384/493; 384/504; 384/512; 384/513
(58) Field of Search ................ 384/493, 512, 384/513, 569, 557

(56) References Cited

U.S. PATENT DOCUMENTS 5,547,291 A * 8/1996 Miyazaki et al. .......... 384/512
6,202,306 B1 * 3/2001 Miyazaki ................... 384/513
6,394,657 B1 * 5/2002 Takamizawa et al. ...... 384/512

* cited by examiner

Primary Examiner—Lenard A. Footland
(74) Attorney, Agent, or Firm—Israel Gopstein (57) ABSTRACT

A compound bearing apparatus including a shaft, a cylindrical outer ring member surrounding the shaft, and a plurality of balls of the first and the second rows interposed between the shaft and the outer ring member is provided.

The bearing apparatus of the present invention is characterized in that: the outer ring member includes upper and lower portions and a central portion therebetween, two rows of outer raceways for the first and the second row of balls are formed on the inner peripheral surface of the upper and lower portions of the outer ring member, a squeeze ring of the same material as that used in making the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion.

19 Claims, 7 Drawing Sheets

//  COMPOUND BEARING APPARATUS

BACKGROUND OF THE INVENTION

1. Technical Field

The present invention relates to an improved bearing preferable for journaling the rotational portion for office automation equipments like computers and peripheral devices therefor.

2. Description of the Prior Art

Figure 13:
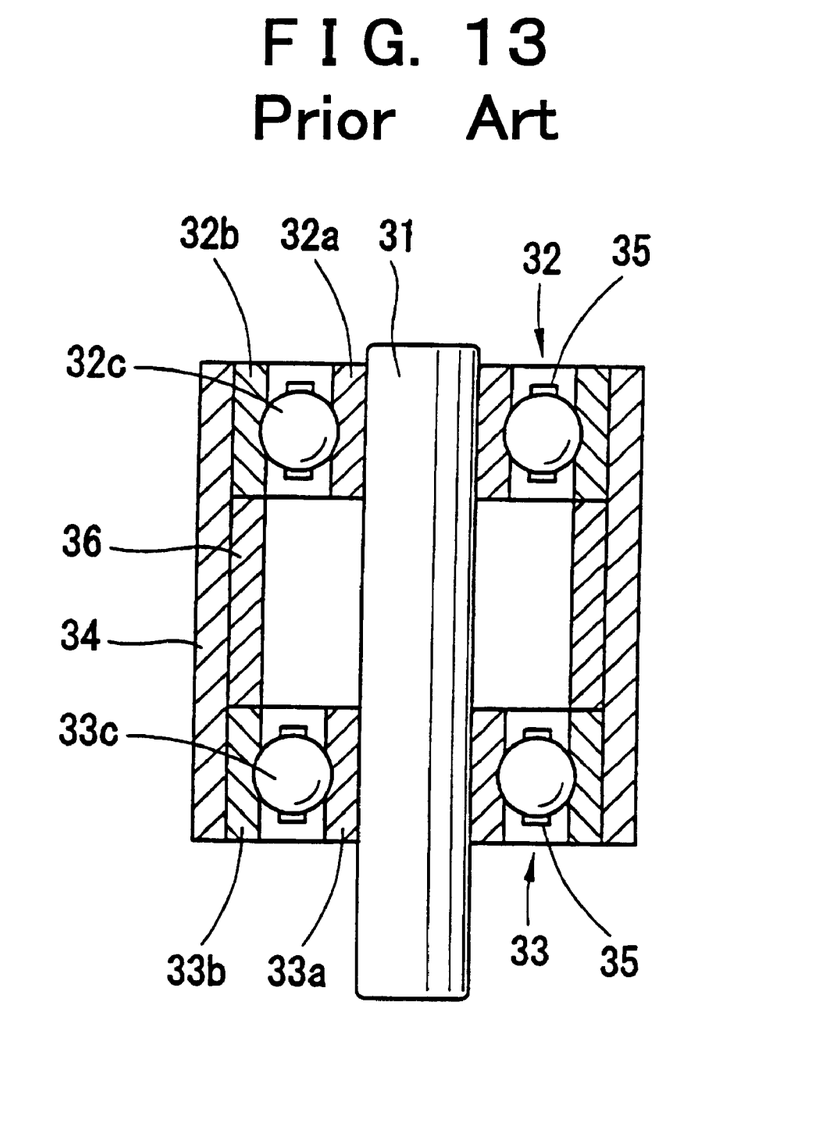
FIG. 13 is a vertical sectional view showing the bearing apparatus of the prior art.

The bearing apparatus is used for journaling a rotational portion such as a motor for driving the magnetic disc or discs, or a swing arm of a hard disc drive device as peripheral devices for computers. As shown in FIG. 13, the bearing apparatus includes upper and lower ball bearings 32, 33 having inner rings 32a, 33a fit and attached to a shaft 31 and outer rings 32b, 33b fit within a sleeve 34.

In FIG. 13, balls are denoted by the reference numeral 32c, 33c, ball retainers are denoted by the reference numeral 35, and a spacer is denoted by the reference numeral 36.

Upon rising the temperature of the bearing under the effect of the frictional heat generated by the rotation or operation of the bearing apparatus itself or the effect of heat energy supplied from the outside of the bearing, the components of the bearing expand into different dimensions. In the case of the ball bearings 32, 33, the order of the amount of expansion in the diametrical direction of the components is;

the outer ring>the inner ring>balls.

In other words, the spacing between the inner and outer raceways of the inner and outer rings enlarged upon rising the temperature of the bearing is larger than the amount of expansion of the balls so that the pressure applied by the inner and outer raceways of the inner and outer rings on the balls i.e. the pre-load is reduced. This causes the resonant frequency upon rotating of the bearing apparatus to vary, and in some cases the resonance with the other components of the equipment into which the bearing is incorporated is caused.

When the bearing apparatus of the prior art of the above described structure is used in the rotating portion of the motor for driving the hard disc drive device, sometimes the accuracy of writing or reading out the data is failed by the vibration of the drive device caused by the resonance with the other component such as a swing arm or a casing. There is also a possibility for generating noises caused by the vibration, and reducing the quietness of the drive device.

Provided that the difference of the amount of thermal expansion of the inner and outer rings is increased further, a clearance is defined between the balls and the raceways of the inner and outer rings, and the rotational run out of a hub of the motor and the run out of the surface of the magnetic disc or discs due to the rotational run out of the hub of the motor are generated. This will deteriorate the reliability of the hard disc drive device.

Although the balls are usually made of steel material, ceramic material may also be used for enhancing the durability thereof. In such a case, the above mentioned problem caused by the difference of the amount of thermal expansion between components will become more serious, since the amount of thermal expansion of the ceramic material is further lower than that of the steel material.

Accordingly the object of the present invention is to provide a bearing apparatus wherein an appropriate pre-load is applied constantly to the balls even if the components of the bearing apparatus expand by rising the temperature thereof. The purpose of the present invention is to provide a bearing apparatus of high rotational accuracy wherein the variation of the resonant frequency and the rotational run out caused by the variation of the temperature are reduced.

SUMMARY OF THE INVENTION

In order to achieve the purpose of the present invention, a bearing apparatus according to the first aspect of the present invention comprises a shaft, a cylindrical outer ring member surrounding the shaft, and a plurality of balls of the first and the second rows interposed between the shaft and the outer ring member, the bearing apparatus being characterized in that:

the outer ring member includes upper and lower portions and a central portion therebetween, two rows of outer raceways for the first and the second row of balls are formed on the inner peripheral surface of the upper and lower portions of the outer ring member, a squeeze ring of the same material as that used in forming the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion.

A compound bearing apparatus according to the second aspect of the present invention comprises a shaft to which an inner ring is fit slidably, a cylindrical outer ring member surrounding the shaft, a plurality of balls of the first row interposed between the first inner raceway formed on the outer periphery of the inner ring and the first outer raceway formed on the inner periphery of the outer ring member, a plurality of balls of the second row interposed between the second inner raceway formed directly on the outer periphery of the shaft and the second outer raceway formed on the inner periphery of the outer ring member, the bearing apparatus being characterized in that:

the outer ring member includes upper and lower portions on the inner periphery of which is provided with the first and the second outer raceways respectively and a central portion therebetween, a squeeze ring of the same material as that used in forming the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion, wherein the inner ring is secured to the shaft with applying an appropriate pre-load thereon.

A compound bearing apparatus according to the third aspect of the present invention including a stepped shaft having a larger diameter shaft portion and a reduced diameter shaft portion, an inner ring fit slidably around the reduced diameter shaft portion of the stepped shaft, and a cylindrical outer ring member surrounding the shaft, a plurality of balls of the first row interposed between the first inner raceway formed on the outer periphery of the inner ring and the first outer raceway formed on the inner periphery of the outer ring member, and a plurality of balls of the second row interposed between the second inner raceway formed directly on the outer periphery of the larger diameter shaft portion and the second outer raceway formed on the inner periphery of the outer ring member, the bearing apparatus being characterized in that:

the outer ring member includes upper and lower portions on the inner periphery of which is provided with the first and the second outer raceways respectively and a central portion therebetween, a squeeze ring of the same material as that used in forming the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion, wherein the inner ring is secured to the shaft with applying an appropriate pre-load thereon, and the outer diameter of the inner ring is identical with that of the larger diameter shaft portion of the stepped shaft, and the balls of the first row are identical in their diameter with that of the balls of the second row.

The balls made of ceramic material are used.

In the compound bearing apparatus of an embodiment in accordance with the present invention, a thin walled reduced outer diameter portion is formed around the outer periphery of the central portion of the outer ring member, and the squeeze ring is press fit around the reduced outer diameter portion.

In the compound bearing apparatus of another embodiment in accordance with the present invention, the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and the squeeze ring is press fit around the reduced outer diameter stepped portions.

In the compound bearing apparatus of the other embodiment in accordance with the present invention, the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and each of the first and the second squeeze rings is press fit around the reduced outer diameter stepped portions respectively.

In the compound bearing apparatus of the further embodiment in accordance with the present invention, the squeeze ring is formed on the inner periphery thereof with a thick walled reduced inner diameter portion having an inner diameter smaller than the outer diameter of the outer ring member, an axial width of the thick walled portion is smaller than the spacing between two rows of outer raceways, and the outer ring member is urged by the reduced inner diameter portion of the squeeze ring.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Preferred embodiments of a bearing apparatus in accordance with the present invention will now be described in detail with reference to the concrete examples illustrated in the attached drawings.

Figure 1:
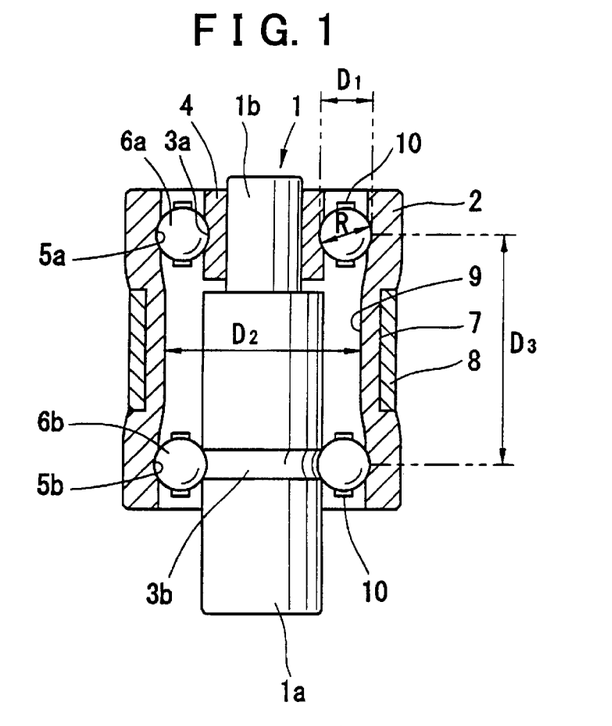
FIG. 1 is a vertical sectional view showing the bearing apparatus in accordance with the first embodiment of the present invention.

A bearing apparatus in accordance with the first embodiment of the present invention comprises a stepped shaft 1 having a larger diameter shaft portion 1a and a reduced diameter shaft portion 1b, an outer ring member or a sleeve outer ring 2 surrounding the stepped shaft, and an inner ring 4 fit around the reduced diameter shaft portion 1b of the stepped shaft. The inner ring 4 has the first inner raceway 3a formed as a groove therearound. The larger diameter shaft portion 1a has the second inner raceway 3b formed as a groove around the outer periphery thereof.

The sleeve outer ring 2 includes upper and lower portions and a central portion interposed therebetween. A pair of parallel first and second outer raceways 5a and 5b is formed as a pair of grooves directly on the inner peripheral surface of the upper and lower portions. The sleeve outer ring 2 is adapted to serve as an outer ring in common with both rows. A plurality of balls 6a for the first row are interposed between the first outer raceway 5a and the first inner raceway 3a, and a plurality of balls 6b for the second row are interposed between the second outer raceway 5b and the second inner raceway 3a.

The balls 6a and 6b are made for example of ceramic material and have the same diameter. This is because the outer diameter of the inner ring 4 is the same as that of the larger diameter shaft portion 1a of the stepped shaft.

A thin walled reduced outer diameter portion 7 is formed on the outer periphery of the central portion of the sleeve outer ring 2. A squeeze ring 8 is adapted to be press fit into the reduced outer diameter portion 7. The squeeze ring is made of a material of substantially the same factor of linear thermal expansion as the sleeve outer ring such as iron material or aluminum material.

The inner diameter of the squeeze ring 8 is smaller than the outer diameter of the reduced outer diameter portion 7 before assembling the ring therearound. The assembling operation of the ring on the reduced outer diameter portion 7 is effected by the shrink-fit technique. The outer diameter of the squeeze ring 8 is the same as that of the upper lower larger outer diameter portion of the sleeve outer ring.

When the squeeze ring 8 is press fit around the reduced outer diameter portion 7 of the sleeve outer ring 2, the ring 2 is squeezed or pressed inwardly to form on the inner peripheral surface of the central portion thereof a squeezed portion 9 protruding inwardly under the effect of the elastic deformation of the sleeve outer ring.

The inner diameter of the squeeze ring 8 is determined on the basis of the material employed for the sleeve outer ring 2 and the threshold value of the increased temperature upon used the bearing apparatus. The amount of deformation of the squeezed portion 9 formed around the sleeve outer ring 2 should be within the elastic limit of the material of the sleeve outer ring. The reference numeral 10 denotes each ball retainer.

When it is intended to assemble the bearing apparatus of the arrangement as described above, the squeezing ring 8 is at first press fit around the reduced outer diameter portion 7 of the sleeve outer ring 2 by employing the shrink fit technique to form the squeezed portion 9 on the inner peripheral surface of the sleeve outer ring.

Thus the upper and lower portions of the sleeve outer ring 2 are drawn toward the squeezed portion 9 to reduce the longitudinal spacing $D_3$ between the outer raceways relative to the condition before press fit the squeezing ring 8.

Subsequently, the inner ring 4 is fit slidably around the reduced diameter shaft portion 1b of the stepped shaft 1, the sleeve outer ring 2 and the balls 6a, 6b of the first and second rows are assembled therearound, and the inner ring 4 is secured on the reduced diameter shaft portion 1b by any means such as an adhesive with applying an appropriate pre-load pressure on the upper end surface of the inner ring 4. Thus the compound bearing is completed.

The temperature of the bearing apparatus will rise under the effect of the frictional heat generated by the rotation or the operation of the bearing apparatus thereof, or the effect of heat energy supplied from the outside of the bearing apparatus. When the temperature rises, the thermal expansion of each component of the bearing apparatus will be caused. The amount of the thermal expansion of the sleeve outer ring 2 in the diametrical direction is larger than that of the inner ring 4 and/or the stepped shaft 1.

Consequently, the spacing $D_1$ between each of the first and second inner raceways and the outer raceway will increase upon rising the temperature. In this connection, the bearing apparatus is deformed to reduce the load applied by the raceways on the balls through the contact therewith. This is because the amount of the thermal expansion of the balls is smaller than that of the inner ring 4 and/or the stepped shaft 1 and the sleeve outer ring.

On the other hand, the average diameter of the squeezing ring 8 is larger than that of the sleeve outer ring 2 so that upon rising the temperature of the bearing apparatus, the squeeze ring expands to the amount larger than that of the sleeve outer ring, the urging pressure applied by the squeezing ring 8 on the sleeve outer ring 2 will be reduced, and the sleeve outer ring 2 tend to retrieve its original straight cylindrical configuration under the effect of the elastic recovering force, i.e. the inner diameter $D_2$ of the squeezed portion 9 is increased or the amount of protrusion thereof is decreased to extend the sleeve outer ring in the axial direction. In other words, the sleeve outer ring itself expands axially and the longitudinal spacing $D_2$ between the first and the second outer raceways 5a and 5b is also increased, so that the bearing apparatus is deformed to increase the pre-load.

In conclusion, the reduction of the pre-loading pressure on the balls due to the enlargement of the spacing $D_1$ between each of the first and second inner raceways of the first and second ball rows and the outer raceway will be offset by the augmentation of the pre-load on the balls due to the enlargement of the longitudinal spacing $D_3$ between the first and the second outer raceways. Thus an appropriate pre-load can be maintained even if the temperature of the apparatus rises.

In the above mentioned bearing apparatus of the first embodiment, the sleeve 2 is served as an outer ring in common with both of the upper and lower bearing means so that the number of parts can be reduced, the diameter of the larger diameter shaft portion 1a can be enlarged by the sum of the thicknesses of the inner and the outer rings of the ball bearing, and the diameter of the reduced diameter shaft portion 1b can also be enlarged by the thickness of the outer ring of the ball bearing, i.e. the generally thick shaft can be obtained.

Accordingly, the stepped shaft 1 of higher rigidity, good at durability, inhibited in its rotational run out, and good at quietness can be obtained.

Figure 2:
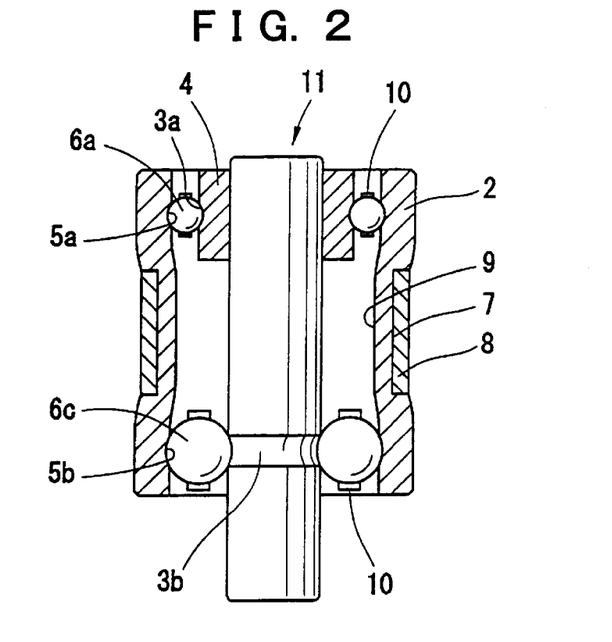
FIG. 2 is a vertical sectional view showing the bearing apparatus in accordance with the second embodiment of the present invention.

In the bearing apparatus of the first embodiment as described above, although the shaft is formed as the stepper shaft 1, the shaft can be a straight one as that of the second embodiment as shown in FIG. 2.

The bearing apparatus of the second embodiment is also provided with the inner ring 4 on the side of the first row of balls 6a (i.e. the upper side in FIG. 2). Whereas no inner ring is provided on the side of the second row of balls 6c (i.e. the lower side in FIG. 2), and the second inner raceway 3b is formed directly on the outer peripheral surface of the straight shaft 11.

Thus the balls 6c of the second row are larger in their diameter than that of the balls 6a of the first row.

The general structure of the bearing apparatus of the second embodiment is substantially identical with that of the first embodiment but for the arrangement of the shaft and the balls of the second row.

The bearing apparatus of the first and the second embodiments have the sleeve outer ring 2 served as one common outer ring member having on its inner surface the outer raceways 5a, 5b of the two rows. Whereas, the outer ring can be divided into an upper first sleeve outer ring 2a and a lower second sleeve outer ring 2b as the third to the sixth embodiments as shown in FIGS. 3 to 6.

Figure 3:
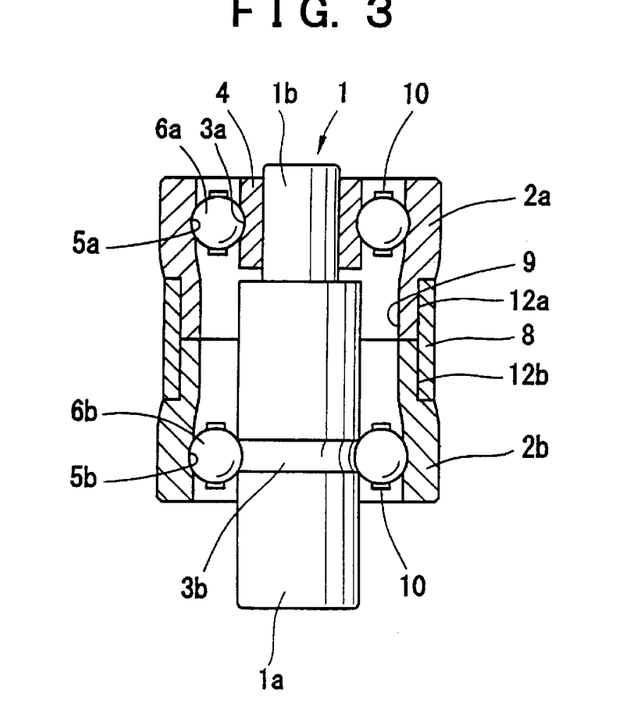
FIG. 3 is a vertical sectional view showing the bearing apparatus in accordance with the third embodiment of the present invention.
Figure 4:
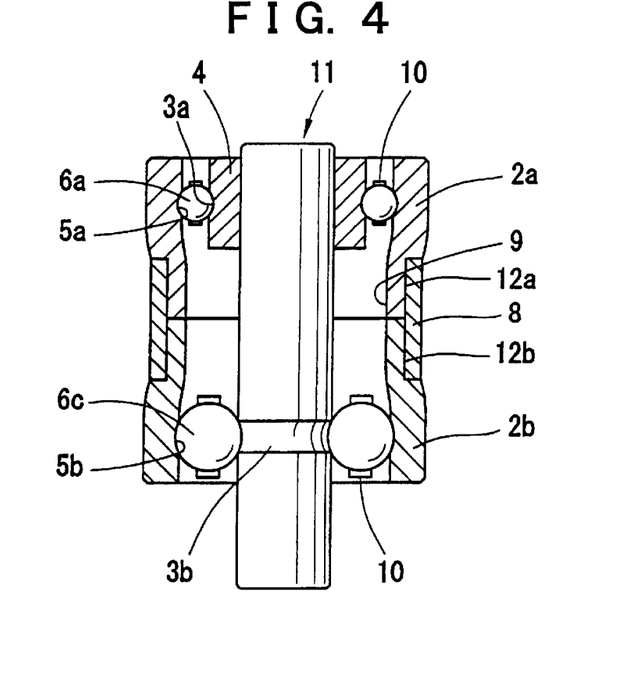
FIG. 4 is a vertical sectional view showing the bearing apparatus in accordance with the fourth embodiment of the present invention.

In the third and the fourth embodiments, each of the first and the second sleeve outer rings 2a and 2b is formed with reduced outer diameter stepped portions 12a, 12b respectively on their ends opposed with each other. The end faces of these reduced outer diameter stepped portions are machined in high accuracy to contact intimately with each other. A squeeze ring 8 is adapted to be press fit around the outer periphery of the reduced outer diameter portions 12a, 12b.

The bearing apparatus of the fourth embodiment as shown in FIG. 4 is arranged to substitute a straight shaft 11 for the stepped shaft 1 of the third embodiment shown in FIG. 3, and the components or the arrangements other than the shaft and the balls of the second row are identical with those of the third embodiment.

Figure 5:
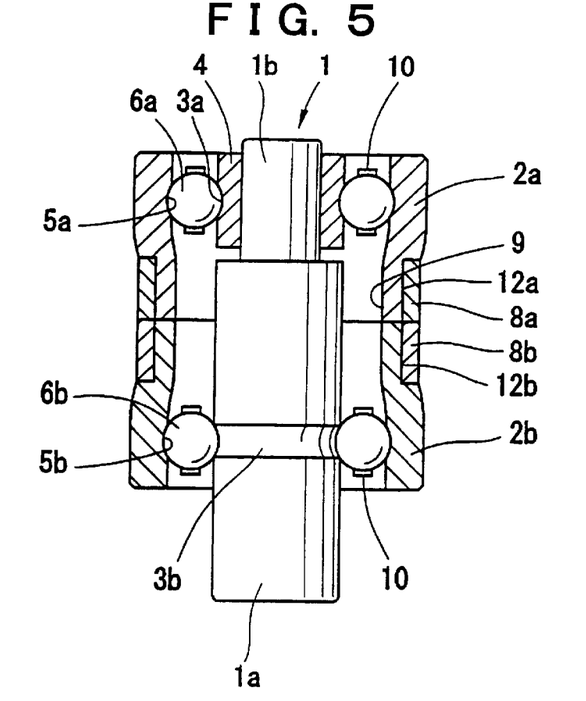
FIG. 5 is a vertical sectional view showing the bearing apparatus in accordance with the fifth embodiment of the present invention.
Figure 6:
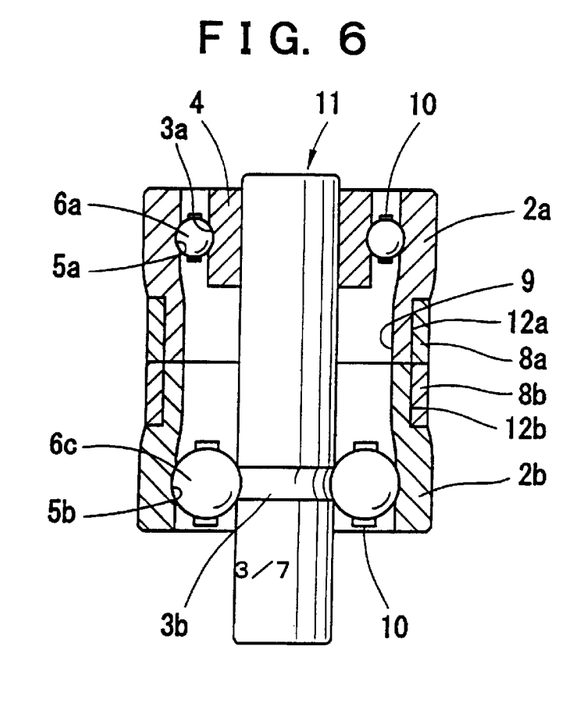
FIG. 6 is a vertical sectional view showing the bearing apparatus in accordance with the sixth embodiment of the present invention.

In the bearing apparatus of the fifth and the sixth embodiments, each of the thin walled reduced outer diameter stepped portions 12a, 12b are formed respectively on the ends of the first and the second sleeve outer rings 2a and 2b opposed with each other. The end faces of these reduced outer diameter stepped portions are machined in high accuracy to contact intimately with each other. Each of the first and the second squeeze rings 8a, 8b is adapted to be press fit respectively around the outer periphery of each of the reduced outer diameter portions 12a, 12b.

The bearing apparatus of the sixth embodiment as shown in FIG. 6 is arranged to substitute a straight shaft 11 for the stepped shaft 1 of the fifth embodiment shown in FIG. 5, and the components or the arrangements other than the shaft and the balls of the second row are identical with those of the fifth embodiment.

In the bearing apparatus of the third to sixth embodiments, the press fitting operation of the squeeze ring 8 or the rings 8a, and 8b around the reduced outer diameter portions 12a, 12b of the sleeve outer ring can be effected easier than those effected on the first and second embodiments, since the sleeve outer rings of these embodiments are divided or separated into the upper and lower outer rings.

In the bearing apparatus of the above described first and second embodiments the sleeve outer ring 2 served as one common outer ring member a pair of outer raceways formed thereon. It is difficult to machine these two outer raceways with assuring the concentricity and/or parallelism between the raceways in high accuracy. This machining operation is particularly difficult where the balls of the first row are spaced relatively larger from those of the second row. Whereas in the bearing apparatus of the third to the sixth embodiments the machining operation of the outer raceways in high accuracy can relatively easily be carried out. This is because the sleeve outer ring is divided into two sleeve outer rings 2a, 2b, and the machining operation might be carried out in each of these sleeve outer rings. In other words, the outer raceways can easily be machined in high accuracy. This will bring the great advantage that the raceways can easily be machined in high accuracy even if the spacing between the balls of the first row and those of the second row is relatively large.

In the bearing apparatus of the third to the sixth embodiments, the outer diameter of the squeeze ring 8 or the rings 8a, and 8b is identical with that of the upper and lower larger outer diameter portions of the sleeve outer ring 2 or the rings 2a, 2b in the same manner as those of the first and the second embodiments.

The bearing apparatus of the above described the first to the sixth embodiments are formed straight on its outer diameter, so that a rotor hub or a rotating member of the motor can easily be mounted on the bearing member without requiring any special machining of the rotor hub.

In the bearing apparatus of the above described the first to the sixth embodiments, the thin walled reduced outer diameter portion 7 or the reduced outer diameter stepped portions 12a, 12b is formed around the sleeve outer ring and the squeeze ring 8 or the rings 8a, and 8b is press fit thereto. Whereas the bearing apparatus of the seventh and the eighth embodiments shown in FIGS. 7 and 8, a sleeve outer ring 13 of the straight cylindrical configuration having no stepped portion around the outer peripheral surface thereof is used. A squeeze ring 14 may be mounted around the outer periphery of the sleeve outer ring 13.

Figure 7:
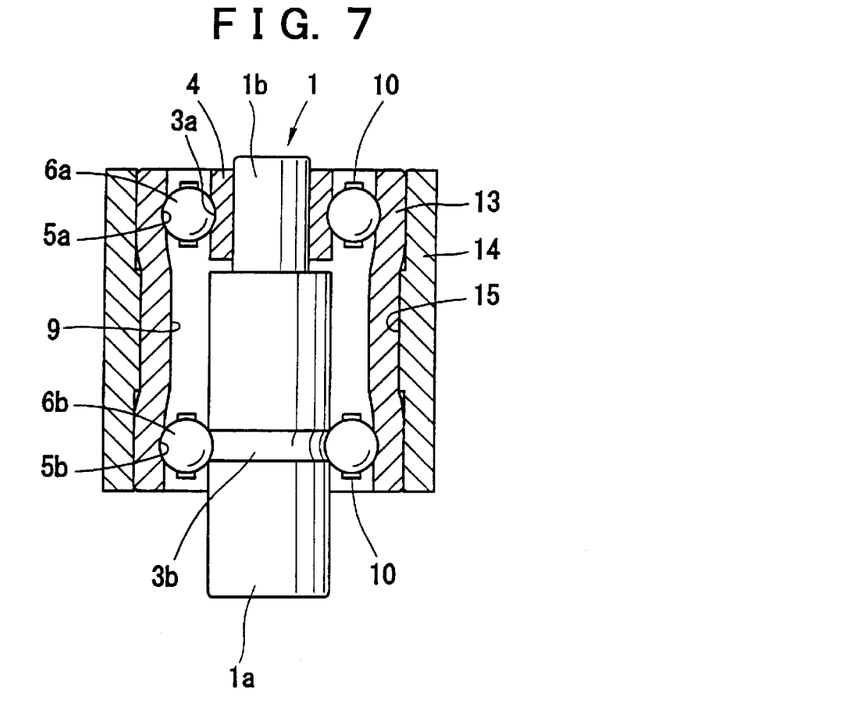
FIG. 7 is a vertical sectional view showing the bearing apparatus in accordance with the seventh embodiment of the present invention.
Figure 8:
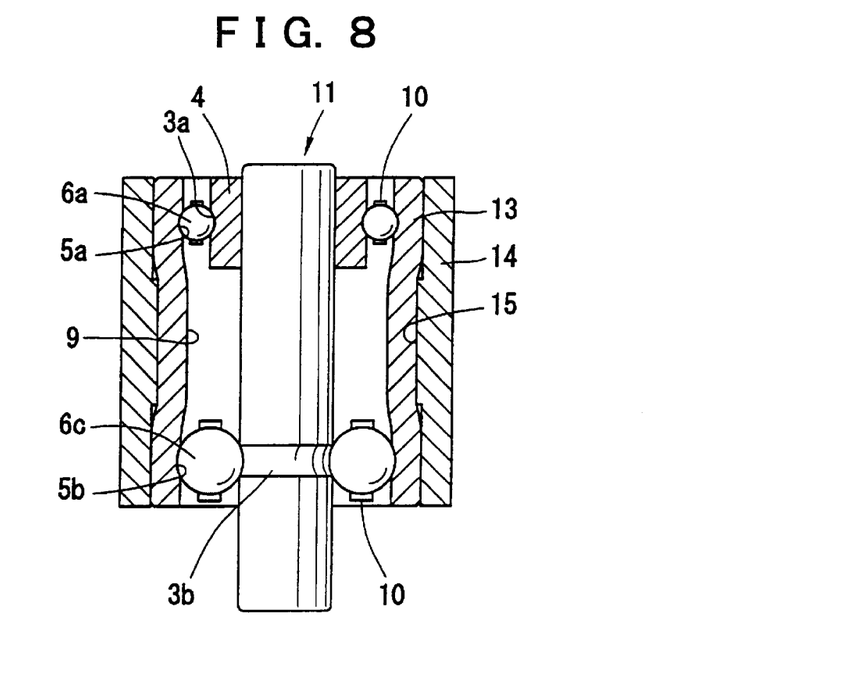
FIG. 8 is a vertical sectional view showing the bearing apparatus in accordance with the eighth embodiment of the present invention.

Each of the squeeze rings 14 of the seventh and the eighth embodiments has a straight cylindrical configuration having an outer periphery of a constant diameter in the axial direction. The squeeze ring 14 has on its inner peripheral surface upper and lower larger inner diameter portions and a thick walled reduced inner diameter portion 15 therebetween.

The inner diameter of the upper and lower larger inner diameter portions of the squeeze ring 14 is larger than the outer diameter of the sleeve outer ring so that a slight clearance is defined between each larger inner diameter portions and the outer peripheral surface of the sleeve outer ring. Whereas the inner diameter of the reduced inner diameter portion is smaller than the outer diameter of the sleeve outer ring 13 so that the sleeve outer ring 13 is urged inwardly by the reduced inner diameter portion 15. Thus the sleeve outer ring is deformed elastically under the influence of the urging force to form a squeezed portion 9 protruding inwardly on the inner surface thereof between the first and the second outer raceways 5a, 5b.

The inner diameter of the reduced inner diameter portion 15 is determined on the basis of the materials employed for the sleeve outer ring 13 and the threshold value of the increased temperature upon used the bearing apparatus. The amount of the deformation of the squeezed portion 9 formed around the sleeve outer ring 13 should be within the elastic limit of the material of the sleeve outer ring.

The bearing apparatus of the ninth to the twelfth embodiments as shown in FIGS. 9 to 12 are devised to facilitate the initial deformation of the sleeve outer ring 13 of the seventh and the eighth embodiments as described above.

Figure 9:
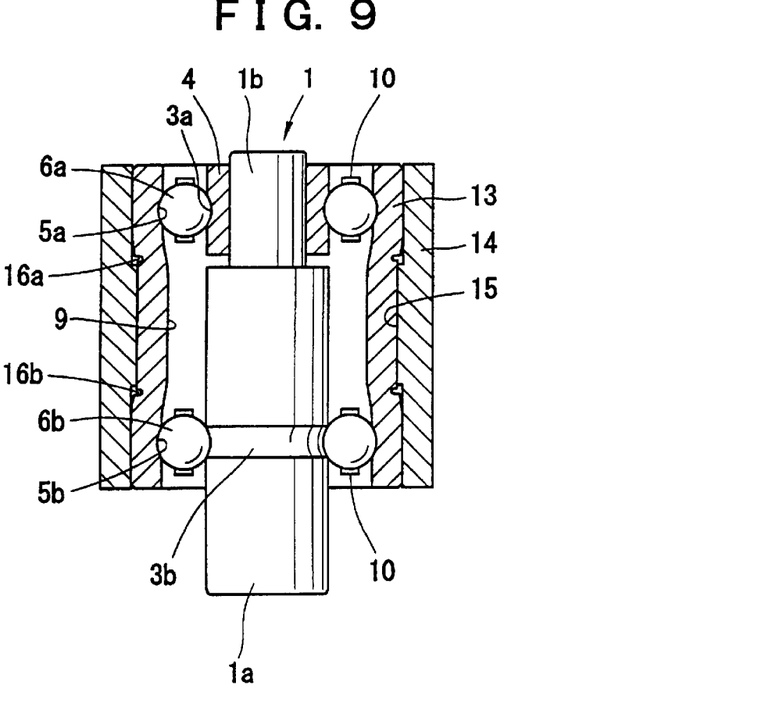
FIG. 9 is a vertical sectional view showing the bearing apparatus in accordance with the ninth embodiment of the present invention.
Figure 10:
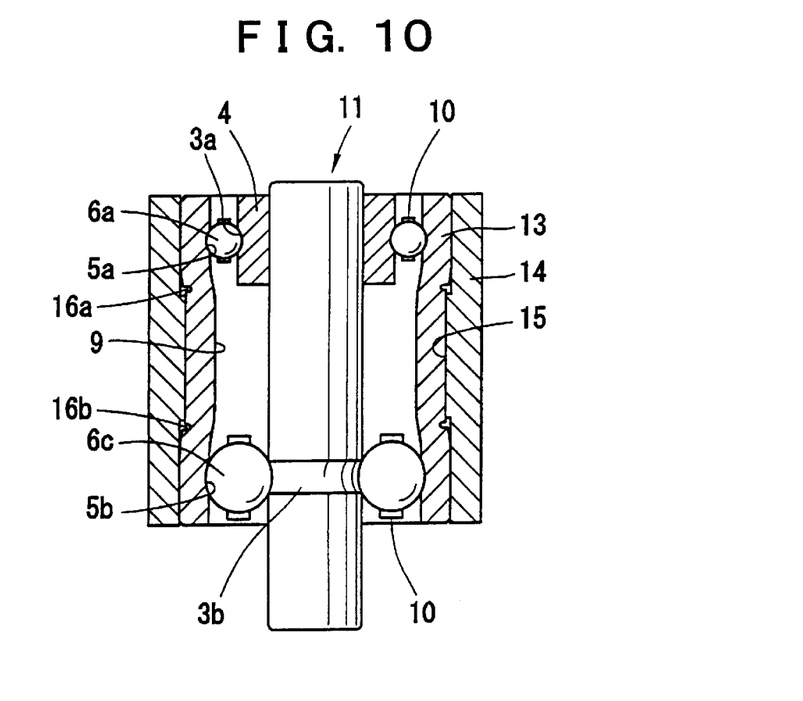
FIG. 10 is a vertical sectional view showing the bearing apparatus in accordance with the tenth embodiment of the present invention.

The bearing apparatus of the ninth and the tenth embodiments include the sleeve outer ring 13. The sleeve outer ring 13 can be divided into upper and lower portions on the inner surface of which is provided with the first and the second outer raceways 5a, 5b respectively and one central portion interposed between the upper and lower portions. The sleeve outer ring 13 is provided on the outer peripheral surface of the central portion with a pair of parallel peripheral grooves 16a, 16b.

The bearing apparatus of the ninth and the tenth embodiments a portion of the sleeve defined between the peripheral grooves 16a, 16b is urged by the reduced inner diameter portion 15 of the squeeze ring 14 to deform inwardly to form a squeezed portion 9.

The general structure of the bearing apparatus of the tenth embodiment as shown in FIG. 10 is substantially identical with that of the ninth embodiment as shown in FIG. 9 but for the arrangement of the shaft and the balls of the second row.

Figure 11:
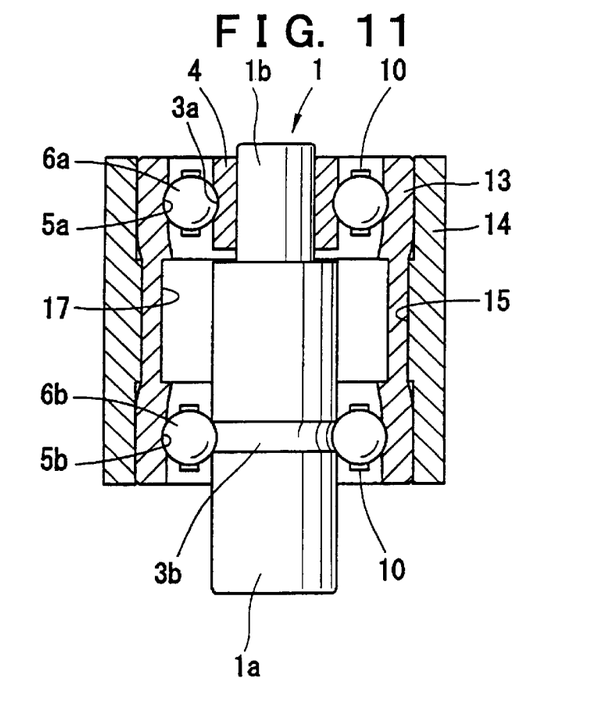
FIG. 11 is a vertical sectional view showing the bearing apparatus in accordance with the eleventh embodiment of the present invention.
Figure 12:
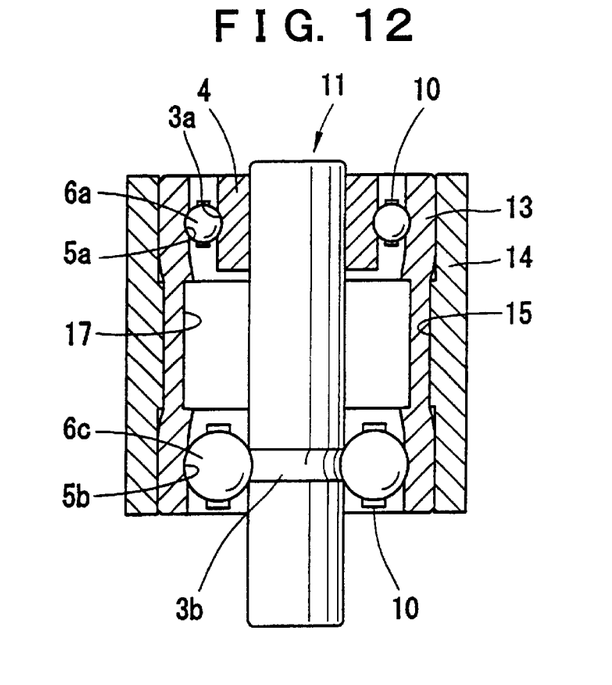
FIG. 12 is a vertical sectional view showing the bearing apparatus in accordance with the twelfth embodiment of the present invention.

The bearing apparatus of the eleventh or the twelfth embodiments as shown in FIGS. 11 and 12 has a sleeve outer ring 13 including upper and lower portions and a central portion therebetween. The upper and lower portions of the sleeve outer ring 13 are provided on their inner peripheral surfaces with the first and the second outer raceways 5a, 5b. The central portion of the sleeve outer ring is provided on its inner peripheral surface a larger inner diameter portion 17 of the width substantially identical with that of the reduced inner diameter portion 15 of the squeeze ring 14.

The sleeve outer ring 13 of the bearing apparatus of the eleventh or the twelfth embodiments is adapted to be deformed around the larger inner diameter portion 17 inwardly under the influence of the urging force applied by the reduced inner diameter portion 15 of the squeeze ring 14 from the outer side of the outer ring 13.

The general structure of the bearing apparatus of the twelfth embodiment as shown in FIG. 12 is substantially identical with that of the eleventh embodiment shown in FIG. 11 but for the arrangement of the shaft and the balls of the second row.

Although the balls used in each embodiment as described above are made of ceramic material to enhance the durability thereof, steel or any other materials might be used therefor.

The bearing apparatus of the arrangement or the structure as described above in accordance with the present invention will present the following effects or advantages.

The squeeze ring urges the central portion of the outer ring member surrounding the shaft to form a squeezed portion, so that upon rising the temperature of the bearing apparatus, the components of the bearing apparatus will expand to enlarge the spacing between the inner and outer raceways. On the other hand, the outer ring member extends under the effect of elastic recovering force to enlarge the axial spacing between the first and the second outer raceways. Thus the load to be applied to the balls through the contact with the inner and outer raceways, i.e. the pre-load applied on the balls are maintained in a predetermined value.

Consequently, the rotational accuracy of the bearing apparatus can be kept in constant even if the variation of the temperature thereof is occurred. The resonant frequency can substantially be prevented from varied. The rotational run out and the noise accompanied therewith can also be reduced.

The bearing apparatus of longer lifetime can be obtained by using balls of ceramic material. This is because the durability of the ceramic material is greater than steel.

In the bearing apparatus of the third to the sixth embodiment as shown in FIGS. 3–6 in which the outer ring member is formed by a pair of the first and the second sleeve outer ring, the machining operation of the outer raceway on the outer ring member can be effected easily, since each raceway can be formed respectively on each of the first and the second sleeve outer ring.

While particular embodiments of the present invention have been illustrated and described, it should be obvious to those skilled in the art that various changes and modifications can be made without departing from the spirit and scope of the invention.

What is claimed is:

1. A compound bearing apparatus including a shaft, a cylindrical outer ring member surrounding the shaft, and a plurality of balls of the first and the second rows interposed between the shaft and the outer ring member, the bearing apparatus being characterized in that:
   the outer ring member includes upper and lower portions and a central portion therebetween,
   two rows of outer raceways for the first and the second row of balls are formed on the inner peripheral surface of the upper and lower portions of the outer ring member,
   a squeeze ring of the same material as that used in forming the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion.

2. A compound bearing apparatus according to claim 1, characterized in that a thin walled reduced outer diameter portion is formed around the outer periphery of the central portion of the outer ring member, and the squeeze ring is press fit around the reduced outer diameter portion.

3. A compound bearing apparatus according to claim 1, characterized in that the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and the squeeze ring is press fit around the reduced outer diameter stepped portions.

4. A compound bearing apparatus according to claim 1, characterized in that the squeeze ring is formed on the inner periphery thereof with a thick walled reduced inner diameter portion having an inner diameter smaller than the outer diameter of the outer ring member, an axial width of the thick walled portion smaller than the spacing between two rows of outer raceways, and the outer ring member is urged by the reduced inner diameter portion of the squeeze ring.

5. A compound bearing apparatus according to claim 1, characterized in that the balls are made of ceramic material.

6. A compound bearing apparatus according to claim 1, characterized in that the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and each of the first and the second squeeze rings is press fit around the reduced outer diameter stepped portions respectively.

7. A compound bearing apparatus including a shaft to which an inner ring is fit slidably, a cylindrical outer ring member surrounding the shaft, a plurality of balls of the first row interposed between the first inner raceway formed on the outer periphery of the inner ring and the first outer raceway formed on the inner periphery of the outer ring member, a plurality of balls of the second row interposed between the second inner raceway formed directly on the outer periphery of the shaft and the second outer raceway formed on the inner periphery of the outer ring member, the bearing apparatus being characterized in that:
   the outer ring member includes upper and lower portions on the inner periphery of which is provided with the first and the second outer raceways respectively and a central portion therebetween,
   a squeeze ring of the same material as that used in forming the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion,
   wherein the inner ring is secured to the shaft with applying an appropriate pre-load thereon.

8. A compound bearing apparatus according to claim 7, characterized in that a thin walled reduced outer diameter portion is formed around the outer periphery of the central portion of the outer ring member, and the squeeze ring is press fit around the reduced outer diameter portion.

9. A compound bearing apparatus according to claim 7, characterized in that the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and the squeeze ring is press fit around the reduced outer diameter stepped portions.

10. A compound bearing apparatus according to claim 7, characterized in that the squeeze ring is formed on the inner periphery thereof with a thick walled reduced inner diameter portion having an inner diameter smaller than the outer diameter of the outer ring member, an axial width of the thick walled portion smaller than the spacing between two rows of outer raceways, and the outer ring member is urged by the reduced inner diameter portion of the squeeze ring.

11. A compound bearing apparatus according to claim 7, characterized in that the balls are made of ceramic material.

12. A compound bearing apparatus according to claim 7, characterized in that the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and each of the first and the second squeeze rings is press fit around the reduced outer diameter stepped portions respectively.

13. A compound bearing apparatus including a stepped shaft having a larger diameter shaft portion and a reduced diameter shaft portion, an inner ring fit slidably around the reduced diameter shaft portion of the stepped shaft, and a cylindrical outer ring member surrounding the shaft, a plurality of balls of the first row interposed between the first inner raceway formed on the outer periphery of the inner ring and the first outer raceway formed on the inner periphery of the outer ring member, and a plurality of balls of the second row interposed between the second inner raceway formed directly on the outer periphery of the larger diameter shaft portion and the second outer raceway formed on the inner periphery of the outer ring member, the bearing apparatus being characterized in that:

the outer ring member includes upper and lower portions on the inner periphery of which is provided with the first and the second outer raceways respectively and a central portion therebetween, a squeeze ring of the same material as that used in forming the outer ring member or of any other material of substantially the same factor of linear thermal expansion as that of the outer ring member is press fit around the outer periphery of the central portion of the outer ring member to elastically deform the outer ring member inwardly to form an inwardly protruding squeezed portion, wherein the inner ring is secured to the shaft with applying an appropriate pre-load thereon.

14. A compound bearing apparatus according to claim 3, characterized in that the outer diameter of the inner ring is identical with that of the larger diameter shaft portion of the stepped shaft, and the balls of the first row are identical in their diameter with that of the balls of the second row.

15. A compound bearing apparatus according to claim 13, characterized in that a thin walled reduced outer diameter portion is formed around the outer periphery of the central portion of the outer ring member, and the squeeze ring is press fit around the reduced outer diameter portion.

16. A compound bearing apparatus according to claim 13, characterized in that the squeeze ring is formed on the inner periphery thereof with a thick walled reduced inner diameter portion having an inner diameter smaller than the outer diameter of the outer ring member, an axial width of the thick walled portion smaller than the spacing between two rows of outer raceways, and the outer ring member is urged by the reduced inner diameter portion of the squeeze ring.

17. A compound bearing apparatus according to claim 13, characterized in that the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and the squeeze ring is press fit around the reduced outer diameter stepped portions.

18. A compound bearing apparatus according to claim 13, characterized in that the outer ring member includes the first and the second sleeve outer rings adjacent axially with each other, each of the first and the second outer raceways is formed on the inner surface of the first and the second sleeve outer rings respectively, thin walled reduced outer diameter stepped portions are formed around adjacent end portions of the first and the second sleeve outer rings, and each of the first and the second squeeze rings is press fit around the reduced outer diameter stepped portions respectively.

19. A compound bearing apparatus according to claim 13, characterized in that the balls are made of ceramic material.

* * * * *